March 20, 1951     J. R. GROSSMAN ET AL     2,545,694
OIL INDICATOR
Filed Jan. 11, 1949
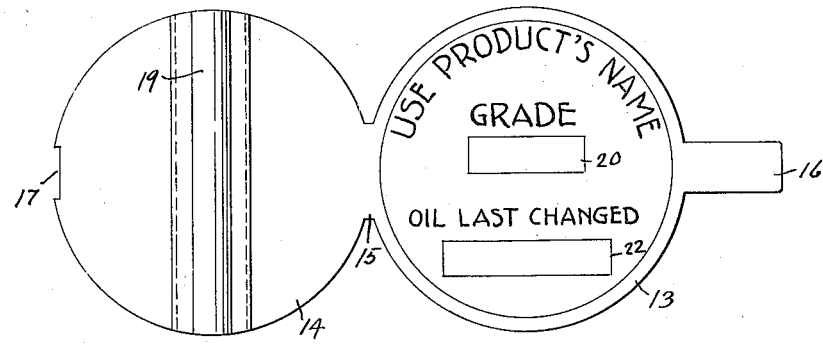
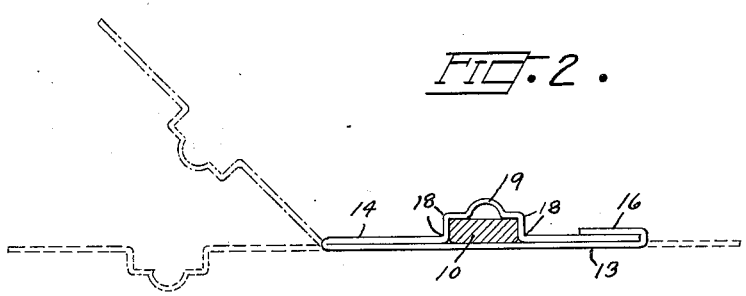
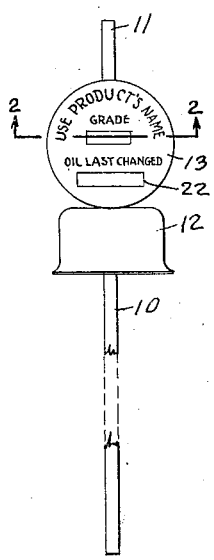
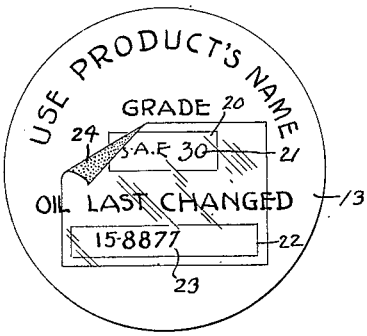
INVENTORS
JOHN R. GROSSMANN
WILLIAM L. MILLIKEN
BY
ATTORNEY Patented Mar. 20, 1951

2,545,694

UNITED STATES PATENT OFFICE 2,545,694

OIL INDICATOR

John R. Grossman, Portland, and William Loren Milliken, Oregon City, Oreg.

Application January 11, 1949, Serial No. 70,238

1 Claim. (Cl. 40—23)

This invention relates generally to indicating devices and particularly to an oil indicator for internal combustion engines.

The main object of this invention is to provide a convenient means for indicating the proper time to change oil as well as to inform the service man as to the kind and viscosity number of the oil being used in a given engine.

The second object is to provide a form of indicator which can be produced at a negligible cost and which can be attached to the oil inspection stick without the use of tools other than a plier.

The third object is to produce an indicator of the class described which lends itself to advertising purposes.

The fourth object is to protect the motor against the use of the wrong oil due to carelessness on the part of the service man or the one giving servicing instructions.

We accomplish these and other objects in the manner set forth in the following specifications as illustrated in the accompanying drawing, in which:

Fig. 1 is a front elevation of the indicator showing it mounted on an oil inspection stick.

Fig. 2 is an enlarged section taken along the line 2—2 in Fig. 1 showing the various positions of the parts in dotted lines.

Fig. 3 is an enlarged view of the indicator prior to being mounted on the oil inspection stick.

Fig. 4 is an enlarged elevation of the front showing the protective covering of transparent adhesive being removed.

Like numbers of reference refer to the same or similar parts throughout the several views.

Referring in detail to the drawing, there is shown a common form of oil inspection stick 10 whose upper end 11 is turned backwardly to form a handle. The stick 10 extends through the hilt 12 which, in some cases, is attached to the stick 10 and in other cases forms the closure for the oil filler pipe (not shown).

Referring particularly to our invention, as previously referred to in our application, Serial No. 783,840, it will be seen to consist of two circular members constituting a front 13 and back 14 which are joined by the neck 15 which is in reality a bendable hinge and is integral with the members 13 and 14.

From the front 13 projects a clasp 16 which can engage and occupy a notch 17 formed in the back 14 when the indicator is in position on the stick 10. The clasp 16 is bent around the back 14, as shown, either by hand or with a plier.

In order to receive the stick 10, the back 14 is formed as shown in Fig. 2, in which a rectangular opening is left by the bends 18 to receive the flat stick 10, or a round stick may be engaged by the rounded side 19.

On the front 13 is provided the name of the oil to be used and in the panel 20 is displayed the number 21 of the oil to be used which, in this case, would be "S. A. E. 30." In the panel 22 is shown the mileage 23 at which the oil was last changed or to be changed or date to be changed.

The front 13 has also placed thereon a strip of transparent adhesive 24 which protects the indicator from wear and soiling. If it is desired to change the notations 21 or 23, it is only necessary to peel off the transparent adhesive 24 and replace it after correction has been made.

It can be seen from the foregoing that by the use of this device a service station attendant is always instructed as to the kind and grade of oil which is to be put into the motor.

We claim:

An oil indicator consisting of a pair of circular front and back members connected at one point by a bendable neck whereby the front and back may be held in super-imposed relationship, the edges of said front and back opposite said neck being provided with a latch, said back having a groove formed across the diameter of its inner side adapted to receive an oil inspection stick, said front having indicated thereon the name and grade of oil to be used and the mileage at the last change and a transparent protector for the information on said front.

JOHN R. GROSSMAN.
WILLIAM LOREN MILLIKEN.

REFERENCES CITED

The following references are of record in the file of this patent:

UNITED STATES PATENTS

| Number | Name | Date |
|---|---|---|
| 637,201 | Gay | Nov. 14, 1889 |
| 839,127 | Felsenthal | Dec. 25, 1906 |
| 1,375,685 | Ericson | Apr. 26, 1921 |
| 2,293,005 | Love, Jr. | Aug. 11, 1942 |